Patented Jan. 16, 1923.

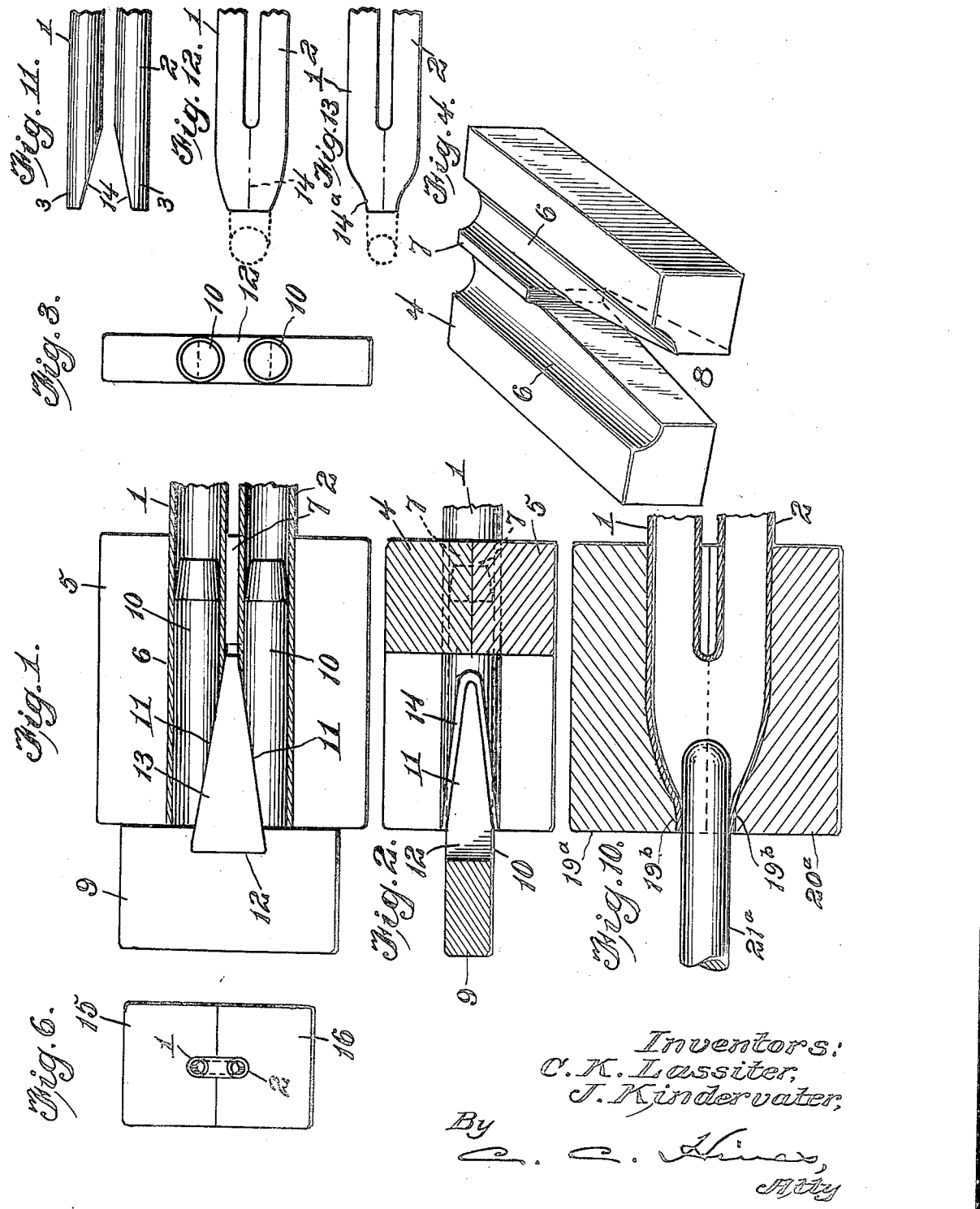

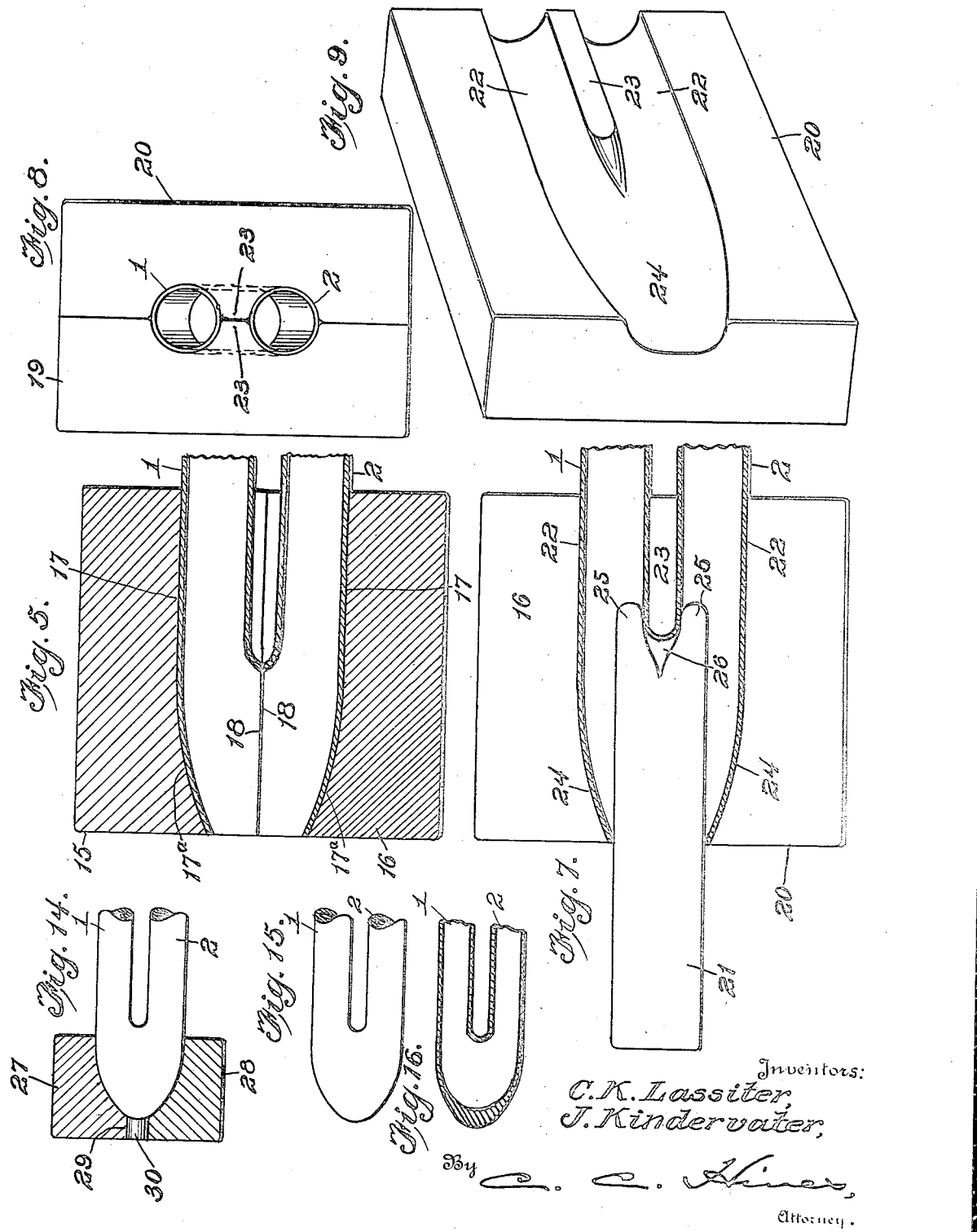

1,442,480

UNITED STATES PATENT OFFICE.

COLUMBUS K. LASSITER AND JULIUS KINDERVATER, OF NEW YORK, N. Y.

METHOD OF MAKING RETURN BENDS.

Application filed August 1, 1921. Serial No. 489,009.

*To all whom it may concern:*

Be it known that we, COLUMBUS K. LASSITER and JULIUS KINDERVATER, citizens of the United States, residing at New York, in the county of New York and State of New York, have jointly invented a certain new and useful Improvement in Methods of Making Return Bends, of which improvement the following is a specification.

Our invention relates to a method of making what are commonly known as return bends, for use in various conducting systems where such bends are used, whether for steam, air, ammonia, or other liquid, gaseous or solid substances, and is especially advantageous in the manufacture of superheater elements for smoke-tube superheaters. More particularly our invention relates to a method of making a return bend which is integral with the pipes, and which is formed by forging and welding from portions of the pipe ends themselves.

In one prior method of making a return bend of the character described, the ends of the pipes are first longitudinally slitted and similar U-shaped half-sections of an incomplete bend are then formed by spreading the pipe walls on each side of the slits outwardly, after which the companion matching longitudinal edges of the spread walls, at the opposed open sides of the U-shaped half-sections, are caused to abut and are welded together. This produces an incomplete bend of elliptical shape and of like dimensions throughout in cross-section, which must be preliminarily contracted and reduced to a cross-sectionally circular form at its open end, before such open end can be tapered down and closed by swaging and welding in the usual way. These steps of splitting, spreading and welding are generally performed in rapid succession, and as a single continuous operation, while the pipe ends are at a first welding heat. An objection to this process is that, owing to the comparatively large size of the open end of the bend, and, consequently, the amount of reduction, number of hammer blows required, and time consumed in preliminary shaping such open end of the bend for the closing operation, a reheating of the bend for such shaping operation is necessary. Furthermore, this operation of shaping or changing the contour of the open end of the bend to such a large degree produces a very pronounced bulging of certain walls of the bend which must be eliminated by a final shaping (flattening) operation. Our invention provides devices for use in a method which enables the pipe walls to be joined with accuracy and precision, without resorting to any spreading operations to secure a proper shape and cross-sectional area of the incomplete bend. Our method also provides devices for the manufacture of an incomplete bend which closely approaches the shape of the completed bend, i. e., which tapers from an elliptical to a circular form at its outer end. As a result, any preliminary shaping of the open end of the bend, which may be necessary preparatory to its closure, is reduced to the minimum, with a consequent reduction in the bulging of the bend walls and in the amount of the final flattening operation. As, also, such shaping may be easily and quickly performed, no special or additional heating of the bend for this purpose is required, as the shaping may be performed during the time period while the just-formed incomplete bend is still sufficiently hot, and by the same heat with which the first weld is made.

In another prior method of making pipe bends of the character described, the pipes are first longitudinally slitted, and then, by means of a special tool, the walls of each pipe on opposite sides of the split are spread, so as to change the original circular cross-section of the pipe end into a U-shaped section, and to round out and concave the wall at the crotch portion or bottom of the slit. Then, by means of another special tool, the end of each pipe is bent or curved at right angles to the pipe axis, the ends of the pipes then squared off parallel with the pipe axes to form abutment faces, and such abutment faces autogenously welded, to connect the bend sections thus formed and complete the bend. The disadvantage of this process is that it does not permit of the production of a bend of conventional tapered form, does not permit of a forged weld being obtained or one free from constricting fins or flashes, and does not admit of expeditious manufacture by forging and welding actions along lines found to be most desirable and as furnishing bends of a most efficient and durable type. Our invention overcomes these disadvantages and provides a method of cheaply and expeditiously making a highly satisfactory form of bend by forging and welding.

One object of the present invention is to provide a method of making a bend by forging and welding which obviates the necessity of slitting, and thereafter spreading or stretching the metal of the pipe ends to be joined.

Another object of our invention is to provide a method whereby one or more of the finishing steps employed in prior processes to give final shape to the bend, may be entirely or practically eliminated.

Still another object of our invention is to provide a method which admits of the ready manufacture of an incomplete bend more nearly approaching the form of the completed bend, as well as the more ready and convenient working of the metal thereafter to complete the manufacture of the bend.

Still another object of our invention is to provide a simplified method, whereby a bend of highly satisfactory and durable type may be cheaply and expeditiously made, in general accordance with established practice.

The invention will be readily understood from the following description, taken in connection with the accompanying drawings, in which:—

Figure 1 is a plan view of the lower half of a shear-die, a mandrel, and a shear blade, adapted for the practice of our invention, as arranged for the first action upon a pair of pipe ends, the said pipe ends appearing in section.

Figure 2 is a section taken on line 2—2 of Figure 1, omitting the shear-blade.

Figure 3 is an end view of the mandrel.

Figure 4 is a perspective view of one of the shear-die sections.

Figure 5 is a vertical section through the bending die and pipe ends, showing the latter bent to form the half-sections of the return bend.

Figure 6 is an end elevation of the die shown in Figure 5.

Figure 7 is a horizontal section through the incomplete bend, as formed by the welding die and mandrel, the lower half of the die and the mandrel appearing in plan.

Figure 8 is an end elevation of the welding die.

Figure 9 is a perspective view of one of the sections thereof.

Figure 10 is a view showing a preliminary bend-closing step.

Figures 11, 12, 13, 14 and 15 are views illustrating the steps of manufacture of the return bend.

Figure 16 is a sectional view through the completed return bend.

In the drawings we have shown certain devices which may be employed for carrying our present invention into practical effect, to the use of which our invention is, however, not necessarily limited, said devices constituting the subject-matter of another application, filed August 2, 1921, Serial No. 489,295.

In the practice of our invention, two pipes 1, 2, which are to be united by a return bend, are arranged in parallel relation, with the extremities of their ends 3 squared and in transverse alinement, and said pipe ends are clamped between two similar halves 4, 5 of a clamping or shear-die. Each of these die members 4, 5, comprises a block having parallel grooves 6, of semi-circular form at one end, the said semi-circular end portions of the grooves, which open through one end of the block, being separated by a partition wall 7. Between this wall 7 and the opposite end of the block, an inclined faced slot 8 is formed, extending from top to bottom of the block, the side walls of said slot extending divergently from the inner end of the wall 7, and progressively diminishing the diameter of the grooves toward the end of the block further therefrom. The die members 4 and 5 are designed to be securely clamped together, to firmly hold the pipe ends for a shearing action and the pipes are also preferably clamped together, outside of the dies, to hold them in fixed relation, and suitable stops are also preferably provided to hold the connected pipes against endwise motion. When the die members 4 and 5 are brought together to clamp the pipe ends 1 and 2, the slots 8 therein register with each other, and form a guide passage, into which portions of the adjacent sides of the pipe project beyond the line of the diverging inner walls of the slots.

For use in conjunction with the die members 4 and 5, a backing die or mandrel is provided, comprising a block or head 9, having a pair of mandrel legs 10, extending therefrom in parallel relation. The head 9 is designed to abut against one end of the clamping or shear-die members 4, 5 and the legs 10 of the mandrel are designed to be inserted into the pipe ends, so as to extend thereinto for a distance greater than the length of the slots 8, said mandrel legs serving to back or firmly support and reinforce the pipes while they are being cut or sheared as hereinafter described. The inner sides of the mandrel legs 10 have portions 11, cut off at an angle conforming to, and alining with, the diverging walls of the slots 8, which slots 8 communicate with a slot 12, extending vertically through the inner face of the mandrel head 9. When the parts are assembled, and the pipe ends clamped in position, as shown in Figure 1 and 2, the slots 8 and 12 will provide a vertical guideway for the downward passage of a wedge-shaped cutter or shear-blade 13, which may be power-operated in any suitable manner. On its down stroke, this shear-blade cuts or shears off those portions of the inner sides of the pipe ends 1 and 2 which project into the guideway beyond the line of the obliquely disposed walls of the slots 8 and portions 11 of the mandrel legs 10, thus cutting away correspondingly shaped segmental portions from the pipes, on oblique lines toward their extremities 3. The obliquity of these cuts may vary as required, or as may be found best suitable for service under different conditions, but, in practice, the end of each pipe is preferably sheared off at a middle point at its extremity, i. e., beginning at about one-half its full diameter, gradually extending outwardly, on decreased lines of development, until the full diameter is reached at the inner end of the cut.

The pipes are then released from the shear-die and mandrel and placed between the sections, 15 and 16, of a bending or primary swaging die, adapted to be used in any suitable forging machine. The members, 15 and 16, of this bending or primary forging die, are divided on a horizontal transverse plane, and the opposed faces of said die members are provided with forming grooves or channels, 17 and 17$^a$. The grooves 17 are substantially semi-circular, and form bores corresponding to the full pipe diameters to receive and hold those uncut portions of the pipe ends lying immediately behind the cut portions 14, while the grooves 17$^a$ cooperate to provide a forming cavity, communicating with the inner ends of said grooves 17, to receive and impart a prescribed form to the said cut portions of the pipes. As shown, the cavity formed by the grooves 17$^a$ is of elliptical cross-section at its inner end, or on that side of its transverse center which intersects the groove 17, and thence gradually tapers and varies from elliptical to circular cross-sectional form at its outer end, such circular end of the cavity within the grooves 17$^a$ being of a contracted diameter, corresponding substantially to the intended final diameter of the open end of the incomplete bend to be formed. Before being placed between the die members 15 and 16, the pipe ends are raised to welding heat, after which the normally open or spaced die members, 15 and 16, are gradually brought together, under hammer blows or pressure, in a forging press or the like, until they are fully closed and their meeting faces abut. As a result of this forging action, the sheared portions of the pipe ends 1 and 2 will be bent or swaged inwardly toward each other, so that their open sides, formed by the cuts 14, will be brought into approximate relation, and the mating oblique edges of their walls brought into substantial alinement, and also substantially in parallel relation to each other and to the axes of the pipes, in readiness to be welded together, to integrally unite the two half-sections of the bend thus formed, and thereby effect the production of an incomplete bend, uniting the pipes and forming a cross channel between the bores thereof. It will be observed that, in the operation above described, the sheared portions of the pipe ends are bent inwardly on elliptical arcs of a degree conforming substantially to the degree of obliquity of the sheared portions of the pipes, or are so bent, according to the line of the shear cuts 14, as to bring the edge walls 18, at the completion of the bend, into abutting relation, or in such close relation that they may be, in the succeeding operation or step of the method, welded securely together to secure a strong and durable joint.

At the completion of the bending operation just described, the die sections 15 and 16 are opened, and the pipe ends removed therefrom and again heated to welding heat, after which they are placed between the members, 19 and 20, of a welding die, employed, in conjunction with a welding mandrel 21, to weld the surfaces 18 together. As shown particularly in Figures 7, 8 and 9, the die members, 19 and 20, are divided on a vertical line, and each die member comprises a block, provided, at one end of its inner or abutment face, with a pair of semi-circular grooves 22, separated by an intermediate partition wall 23, and provided, at its opposite end, with a transversely continuous tapering groove 24. The grooves 22, of the die sections 19, 20, form circular channels, similar to the grooves 17 of the die sections 15, 16, to receive the uncut portions of the pipes lying behind and adjacent to the formed half-bend sections to be joined, while the grooves 24, of the die members 19, 20, provide a forming cavity, similar to the cavity formed by the grooves 17$^a$, of the dies 15, 16, to receive such half-sections of the bend, said cavity 24 being cross-sectionally of elliptical form at its inner end, and gradually tapering to a contracted circular form at its outer end. The mandrel 21 is adapted to be inserted through the reduced end of the cavity 24, between the bent portions of the pipe sections, and comprises a body of proper form for cooperation with the die members 19, 20, to weld together the surfaces of the bend sections which are to be joined, and to impart a smooth internal finish thereto, free from fins or flashes, as well as to act as a forming surface of prescribed diameter, at a point to give proper form and size to the contracted circular end of the incomplete bend. Such mandrel has a crotch forming and welding end, comprising a pair of prongs or forks 25, between the inner portions of which extend inclined crotch forming surfaces 26. The parts being assembled as just described, with the pipe ends at welding heat, the die members 19 and 20, which are normally in open or spaced position, are gradually forced together under hammer blows or pressure, as in a forging press, so as to force and weld the edges 18 together, the forked portion of the mandrel simultaneously serving to draw the inner ends of said edges 18 together, and, acting in conjunction with the surfaces 26, to weld the pipe portions at and in the region of the crotch point, and to give proper shape or conformation to said crotch. It will be understood that in the welding operation referred to, the mandrel 21 may move longitudinally into working position, as the die elements 19 and 20 close, so that it will wipe along and make the surfaces of the joint between the edges 18 smooth and devoid of fins or flashes, and at the same time draw the crotch portions together and give a perfect shape and welding finish to the joint at the crotch.

Figure 11 shows the two pipe ends as cut off preparatory to the formation, bending and welding together of the half-bend sections formed therefrom, and Figure 12 shows the incomplete bend made according to our method. It will be observed by reference to Figure 12 that this incomplete bend differs notably from the incomplete bends produced by other methods in an important respect, to wit, that the bend, instead of being of elliptical form, and of like cross-sectional dimensions throughout, tapers from an elliptical cross-section at about its middle portion to a contracted circular cross-section at its outer end. The incomplete bend as thus produced, therefore, closely approximates, in form and dimensions, the form and dimensions which the completed bend may have, with proper reference to the production of a bend of conventional shape and of any given size. Obviously such an incomplete bend does not require any change in shape at its open end from elliptical to circular contour, as, in the operation of forming the incomplete bend, its open end is given a circular contour and no further shaping in this connection is required. Preparatory to the operation of closing the circular outer end of the bend, however, we may reduce such circular end down to a more restricted circular cross-section, as shown in Figure 13, to better adapt it for the operation of the chosen bend closing devices thereon. This operation of further reducing down or restricting the outer end of the bend may be performed in any suitable manner, as by subjecting the bend to the action of a pair of suitable dies 19ª and 20ª and a coacting mandrel 21ª. These dies, which may be generally similar in construction to the dies 15 and 16, and 19 and 20, are provided with suitable surfaces 19ᵇ for coaction with the mandrel 21ª to reduce the end of the bend to a substantially cylindrical bottle neck formation, as shown by the cylindrical projection 14ª in Figure 13. This shaping reduction is, as shown, comparatively slight, and requires but a comparatively small amount of time, and hence it is not necessary to reheat the bend for this operation after it is removed from the welding dies 19 and 20, as the bend will retain a sufficient amount of the first welding heat to enable this reducing operation to be performed.

The operation of closing the open or cap end of the bend may be effected by swaging or spinning and welding in various ways. As an example, the open end of the bend may be reheated to welding heat and inserted between the sections, 27 and 28, of a swaging die which may be operated to gradually contract and close the outer end of the bend and weld the contracted wall surfaces together. In this operation, there is an excess of metal which must be taken care of, and the die sections are provided, for this purpose, with grooves forming a clearance channel 29, communicating with the forming channel of the die and which receives the excess metal, in the shape of a nub or solid cylindrical section 30, which may be trimmed off in any suitable manner, or, if the excess of metal is not too great, the nub may be upset or flattened against the tip of the bend to give increased thickness thereto, and to seal any possible crevice against leakage. However, instead of swaging and welding the open end of the complete bend between swaging and welding dies, as above described, the same operation may be performed by spinning down and closing and welding the surfaces between suitable spinning rolls or the like.

It is to be understood that while, in the foregoing description, we have set forth a step of reducing down and shaping the open end of the bend, as shown in Figures 10 and 13, preparatory to closing it, as shown in Figure 14, our method is not limited to this step, except as and when specified in claims including said step, as, under some conditions, it is perhaps possible, on account of the form of the incomplete bend produced, to omit this step entirely and to effect the closing of the open end of the incomplete bend, in the shape or substantially in the shape in which it is formed by the dies, 15 and 16, and 19 and 20, without resorting to any preparatory shaping treatment whatever.

In the mode of manufacture herein disclosed, and as particularly shown in Figure 5, the line of cut of the surface 14, and arc of curvature of the sheared portions of the pipe ends, may be such that the edge walls 18 may not be in exact parallel and abutting relation at the end of the bending operation, but may be slightly spread in the region of the crotch portions. With this arrangement, the outer extremities of the edges 18 may have an arc of movement to an extent beyond the center line, while the inner extremities of said edges are still slightly spaced at the end of the operation. This will result in an upsetting and thickening of the metal at the outer extremities of the edges 18, and the drawing together and welding of the spread portions of said edges, and the welding of the crotch portions by the final movement of the dies to closed position and the action of the forked portions 24 of the mandrel, while, at the same time, the metal will be compacted along the lines of weld, and smoothed out by the mandrel, to form a strong and perfect union, entirely devoid of fins or excrescences. However, the line of obliquity of the cuts 14, and arc of curvature of the bends, may be such as to bring the edges 18 in exact alinement and welding contact, or, in the event that the edges 18 are spread in the region of the crotch, the form of the dies 19, 20, may be such as to give a slight inward offset to the body portions of the pipe, adjacent to the bend at the moment of weld, to bring all surfaces to be welded in firm and accurate welding engagement, or such offsetting may be imparted to the pipes prior to treatment.

When the pipe bend, made as above described, is completed, a bend is produced which is of a desired tapered form to split the currents of gases, and reduce resistance to the flow thereof; the cap wall of the bend is properly thickened to secure increased strength and durability; and the bend is otherwise, both in form and construction, made to effectually meet all service conditions in accordance with the best practice. An important advantage of our method, as compared with the first prior method referred to, is that it avoids spreading of the pipe walls and stretching of the metal in order to form a proper weld of the half sections of the bend and to make the bend of proper cross-sectional area. Furthermore, as stated, our method avoids the necessity of reducing the open end from a primarily elliptical to a circular form, before closing and welding the same, as, by forming and bending the half sections in the manner described, they are simultaneously brought into proper relation for a welding connection, and given approximately the final form which the bend is to assume, the open end of the bend being given the desired circular contour without any auxiliary or additional shaping. Inasmuch, also, as the first operation of cutting away portions of the pipe ends, removes practically all of the excess metal which is customarily trimmed off as a final step, the necessity of trimming off a large amount of metal is avoided, the small amount left, in the form of the nub 30, being all that is necessary to be trimmed off, and this may be upset, as described, to increase the thickness of the cap end and seal any possible crevice that might be left. By imparting to the incomplete bend substantially the form which the completed bend is to assume, objectionable bulging of walls from shaping operations is avoided, as will be readily understood. Hence the usual final operation of flattening may be eliminated, or the extent of any flattening operation which may be found necessary reduced to the minimum.

Our method is also materially advantageous over the second method of manufacture hereinbefore referred to, in that it does away with the use of special tools, and special steps requiring hand operations, and adapts the bend to be cheaply and expeditiously manufactured by forging along established lines, and produces a strongly welded bend, of a form found best adapted for the purpose, and which is entirely devoid of internal fins or flashes, and is provided with a cap wall which may be made of any desired thickness during the final closing and welding action, without the necessity of welding an additional thickness of metal thereon. Other advantages of our invention, over this prior method, will also be apparent to those versed in the art.

It will, of course, be understood that while the first step of simultaneously cutting off portions of both pipes obliquely is preferred, such a simultaneous operation is not essential, as the pipes may be, if desired, so prepared for use individually and at different times, or any number of pipes may be simultaneously cut, and afterwards paired for use in the manner described. Also it will be understood that other changes in the method and the steps thereof, falling within the scope of the appended claims, may be made without departing from the spirit of our invention.

Having thus fully described our invention, we claim:—

1. The method of making a pipe bend which consists in taking two pipes having opposed walls, cut away at an angle to their axes for a distance from their ends, thus forming primary sections of a bend provided with edge surfaces to be united; bending such primary bend sections towards each other, on arcs of a degree less than a right angle, so as to bring the corresponding edge surfaces of said bend sections into substantially opposing and abutting relation; welding said corresponding edge surfaces of the bend sections together; and then suitably closing the open end of the incomplete bend so formed.

2. The method of making a pipe bend which consists in taking two pipes having opposed walls, from which substantially triangular sections have been cut at oblique angles to the axes of the pipes and for a suitable distance from their ends, thus forming primary sections of a bend provided with edge surfaces to be united; bending such primary bend sections towards each other, on arcs of a degree less than a right angle, so as to bring the corresponding edge surfaces of said bend sections into substantially opposing and abutting relation; welding said corresponding edge surfaces of the bend sections together; and then suitably closing the open end of the incomplete bend so formed.

3. The method of making a pipe bend which consists in taking two pipes and simultaneously cutting away portions of opposed walls of said pipes at an angle to their axes and for a suitable distance from their ends, thus forming primary sections of a bend provided with edge surfaces to be united; bending such primary bend sections towards each other on arcs of a degree less than a right angle so as to bring the corresponding edge surfaces of said bend sections into substantially opposing and abutting relation; welding said corresponding edge surfaces of the bend sections together; and then suitably closing the open end of the incomplete bend so formed.

4. The method of making a pipe bend which consists in forming the end portions of two pipes with side openings, inclined at an angle to their axes; displacing such portions of the pipes inwardly, relatively to their axial lines and at similar reverse angles to the normal angles of the openings, so as to bring similar edges of the pipe walls in which the openings are formed into substantially opposing and abutting relation, welding such edges of the said pipe walls together; and then suitably closing the open end of the incomplete bend thus formed.

5. The method of making a pipe bend which consists in taking two pipes and obliquely cutting away opposed walls of said pipes for a distance from their ends; bending the ends of the pipes towards each other, on oblique arcs of a degree conforming substantially to the degree of obliquity of the cuts, and so as to bring the companion opposed edges of the cut portion substantially into parallel relation with each other and to the axes of the pipes; welding the said opposed edges of the cut portions together; and suitably closing the end of the incomplete bend thus formed.

6. The method of making a pipe bend which consists in taking two pipes and cutting away opposed side walls of said pipes at an angle to their axes; bending the ends of said pipes laterally towards each other, so that the so formed corresponding inclined edges of said side walls will be brought into matching relation; welding said matched edges of said walls of the pipes together; and then suitably closing the end of the incomplete bend thus formed.

7. The method of making a pipe bend which consists in cutting away opposed side walls of end portions of two pipes, to form openings lying at such an angle to the axes of the pipes that when such pipe portions are bent inwardly, at substantially reverse angles to the normal angles of the openings, like edges of the walls of the pipes bounding said openings will be brought substantially in abutting relation and substantially parallel with each other and with the pipe axes; welding such edges of the walls of the pipes together; and suitably closing the open end of the incomplete bend thus formed.

8. The method of making a pipe bend which consists in taking two pipes and cutting away portions of opposed walls at the ends of the pipes, on straight lines at reverse oblique angles to their axes; bending the cut ends of the pipes inwardly, on elliptical arcs of a degree reversely conforming to the degree of obliquity of the cuts, so as to bring the edge surfaces of said walls bounding the openings in substantially opposed and abutting relation, and substantially parallel with the pipe axes while shaping the cut portions of the pipes, so that when said portions are joined they will form an incomplete bend of elliptical cross-section at its inner end and thence gradually tapering and varying to a relatively contracted circular cross-sectional form at its outer and open end; welding the edge surfaces of the said pipe walls together; and then suitably closing the open circular end of the incomplete bend thus formed.

9. In the art of making pipe bends from portions of two pipes having open sides, which pipe portions are bent inwardly at an angle to the pipe axis and their edge walls welded to form an incomplete bend having an open end designed to be contracted and closed, the improvement which consists in shaping the pipe portions in such bending and welding steps so as to form, directly by such bending and welding steps, an incomplete bend which is of elliptical cross-section at its inner end and thence tapers to a relatively contracted cross-section at its outer end.

10. The method of making a pipe bend which consists in forming two pipe ends with half-bend sections having opposed open sides with inclined edges surfaces to be welded together; bending said pipe ends laterally towards each other so as to bring said inclined edge surfaces into juxtaposition, while simultaneously shaping the said half-bend sections so that, upon the welding of said surfaces together, an incomplete bend will be produced, which tapers longitudinally from an elliptical cross-sectional form at its inner end to a contracted circular cross-section at its outer end; welding said half-bend sections together to produce the incomplete bend above described; and then swaging down and welding the open end of the bend.

11. The method of making a pipe bend, which consists in taking two pipes and cutting away portions of opposed side walls thereof to form half-bend sections, of such shape that when said half-bend sections are bent towards each other, and the walls of the cut away portions are joined, an incomplete bend will be formed which is of elliptical shape in cross-section, and which tapers from its inner end to a reduced cross-section at its outer end; bending said half-bend sections towards each other, so as to bring the walls of the cut away portions in abutting relation; welding said walls together so as to produce the incomplete bend above described; and then suitably closing and welding the reduced outer end of the bend.

12. The herein-described method of making a pipe bend, which consists in taking two pipes having opposed walls, cut away at an angle to their axes for a distance from their ends, thus forming primary sections of a bend provided with edge surfaces to be united; bending such primary bend sections towards each other, on arcs of a degree less than a right angle, so as to bring the corresponding edge surfaces of said bend sections into substantially opposing and abutting relation; welding said corresponding edge surfaces of the bend sections together; reducing the outer end of the elliptically shaped incomplete bend body so produced, so as to form a circular prolongation from such end of said incomplete bend body; and then suitably closing and welding the said reduced end of the body.

13. The method of making a pipe bend, which consists in forming the ends of two pipes to provide incomplete half-bends having opposed open sides with inclined edge surfaces to be united; bending such half-bends laterally towards each other and welding the said inclined edge surfaces thereof, in such manner as to form, directly by such bending and welding steps, an incomplete bend body of elliptical form in cross-section; shaping the outer end of the elliptical incomplete bend body so as to reduce the same to the form of a circular prolongation from the body; and then suitably closing and welding the said reduced end of the body.

14. A conducting element comprising pipes united by a bend integral with said pipes, said bend comprising primarily incomplete portions of the pipes having open sides with surfaces inclined to the pipe axes, said portions being bent inwardly, on oblique arcs disposing said open sides and surfaces in opposed and parallel relation, said surfaces being welded together and the outer end of the bend so formed being suitably closed.

15. A pipe bend composed of cut portions of two pipes, whose opposed surfaces are primarily inclined in divergent relation to each other and to the axes of the pipes, which surfaces are united by bending said portions inwardly, on elliptical arcs, to bring said surfaces in abutting relation and welding the same together.

In testimony whereof we affix our signatures.

COLUMBUS K. LASSITER.
JULIUS KINDERVATER.